Patented Apr. 23, 1940

2,197,964

UNITED STATES PATENT OFFICE 2,197,964

METHOD FOR THE PRODUCTION OF AN ALKALI METAL SALT OF A MONO-ALKYL TRITHIOCARBONATE

William T. Bishop, Wilmington, Del., assignor to Hercules Powder Company, Wilmington, Del., a corporation of Delaware No Drawing. Application July 10, 1937, Serial No. 153,061

7 Claims. (Cl. 260—455)

This invention relates to an improved method for the production of an alkali metal salt of a mono-alkyl trithiocarbonate, and more particularly to a method for the direct production of a solid alkali salt of a mono-alkyl trithiocarbonate containing not more than two molecules of water per molecule of the trithiocarbonate.

It is the object of this invention to provide a method by which an alkyl trithiocarbonate suitable, for example, for use as a flotation reagent can be produced with inexpensive materials and without cumbersome purification procedure. The product of this method is an alkali metal salt of a mono-alkyl trithiocarbonate containing not in excess of two moles of water to each mole of the trithiocarbonate. Surprisingly enough, I have found that this limited quantity of water does not detrimentally effect the stability of the product, or in any way decrease its usefulness, for example, as a flotation reagent.

The method in accordance with this invention comprises reacting an alkyl mercaptan with an alkali metal hydroxide, or an alkali metal monoxide, and with carbon disulfide to produce an alkali metal mono-alkyl trithiocarbonate. The product of this reaction is a solid and requires no purification procedure whatever before use, for instance, as a flotation reagent.

In this method an alkyl mercaptan may be first reacted with a solid alkali metal hydroxide, or a solid alkali metal monoxide to produce an alkali metal mercaptide, and then with carbon disulfide to produce an alkali metal mono-alkyl trithiocarbonate. Alternately, the alkali metal hydroxide or alkali metal monoxide and the carbon disulfide may be added simultaneously to the alkyl mercaptan, and again the carbon disulfide may be added to the alkyl mercaptan, and the solid alkali metal hydroxide or solid alkali metal monoxide then added. Thus, it will be appreciated that the order in which the ingredients are added is not critical.

In carrying out the reaction in accordance with my invention it is unnecessary to utilize reaction medium, such as water or the like to obtain a complete and rapid reaction. Surprisingly, I obtain a complete and rapid reaction without the addition of water, and can obtain a product which contains only the water formed in the reaction, e. g., one mol of water per mol of trithiocarbonate produced when using a solid alkali metal hydroxide, and which is a solid.

In carrying out this method the solid alkali metal hydroxide will desirably be used in the form of flakes or powder to secure rapid reaction, and will desirably be anhydrous. The reaction will preferably be carried out in the absence of any added water either in the reagents or otherwise. The product obtained from such operation will contain only the water released by the reaction. When using an alkali metal hydroxide as a reactant the product will contain one mol of water per mol of trithiocarbonate, and when using an alkali metal monoxide it will contain one-half mol of water per mol of trithiocarbonate.

I have found, however, that I can obtain a solid product which requires no further treatment, provided the total water contained in the product does not exceed about two mols per mol of the trithiocarbonate. When using an alkali metal hydroxide, then, I may add in the reagents or otherwise, water not in excess of about one mol per mole of trithiocarbonate, and when using an alkali metal monoxide I may add water not in excess of about one and one-half mols per mol of trithiocarbonate.

In carrying out the method in accordance with this invention, I prefer to use substantially molecular proportions of the reactants. In any case it is desirable to carry the reaction to completion so that a minimum of free alkali metal hydroxide remains in the final product, since its presence tends to cause the product to be unstable. Substances non-reactive under the conditions of reaction, such as, for example, organic sulfides, hydrocarbons, etc., do not interfere with the reaction and do not harm the product for use as a flotation reagent, provided they are not present in excessive quantities.

The temperature at which I carry out the reaction in accordance with this invention may be within the range of about 0° C. to an upper limit set by the reflux temperature of the volatile ingredients of the reaction mixture, and preferably within the range of about 0° C. to about 40° C. The time of reaction will be that required for the reaction to go to completion. The end of the reaction can be readily determined by the uniformity of the product and by the heat evolution of the reaction mixture. When the mixture ceases to evolve heat and is uniform in appearance, the reaction is complete. The actual time required will depend upon a number of variable factors such as quantities of reactants, efficiency of stirring, etc. and can only be accurately set in terms of the appearance and the heat evolution of the mass.

In carrying out the reaction in accordance with this invention it is desirable to avoid oxidizing conditions, since the product is sensitive in this respect, and hence I prefer to exclude any oxygen from the reaction mixture. This may conveniently be done by blanketing the reaction mixture with a non-oxidizing gas, such as, for example, nitrogen, carbon disulfide, alkyl mercaptan, etc., or by carrying out the reaction under vacuum in a closed system.

The alkyl mercaptan used in this method may be any pure alkyl mercaptan, such as, for example, methyl mercaptan, ethyl mercaptan, propyl mercaptan, isopropyl mercaptan, butyl mercaptan, isobutyl mercaptan, various isomeric amyl mercaptans, mixtures thereof, etc., or I may use a crude mixture of the mercaptans, such as may be obtained as a by-product in the refining of petroleum.

It will be appreciated that in this method, the alkyl mercaptan reacts at the mercaptan group and not at the alkyl group. The alkyl group does not act as a functional group and may be purely hydrocarbon in character or may contain hydrocarbon groupings as well as other groups, provided, however, that such groups are substantially non-reactive under the conditions employed. In any case the mercaptan group will be connected directly to a carbon atom contained in an alkyl hydrocarbon group. Thus, for example, I may react an alkyl mercaptan, the alkyl group of which contains somewhere in its structure an ether linkage, and thereby obtain an alkali metal mono-alkyl trithiocarbonate which likewise contains an ether linkage within its alkyl group. It will be appreciated that where I use the term "alkyl" herein, I do not limit myself to a group which is entirely hydrocarbon in character, but use the term to include all groups of the type indicated, including those which are not purely aliphatic hydrocarbon in character.

The alkali metal hydroxide which I may use may be, for example, sodium hydroxide, potassium hydroxide, caesium hydroxide, etc. The alkali metal oxide which I may use, may be, for example, sodium monoxide, potassium monoxide, lithium monoxide, etc.

This reaction may be carried out in any suitable equipment in which the reaction mixture is subjected to thorough agitation and preferably one in which it is subjected to thorough agitation and disintegrating action. Thus, for example, a mixer of the Werner-Pfleiderer type equipped with blades for shredding action is suitable.

In carrying out the reaction in accordance with this invention flaked or powdered caustic may, for example, be added to a mixer and then the alkyl mercaptan run in onto the caustic while it is being agitated. Adequate cooling is provided to avoid loss of the volatile reagents by evaporation and to avoid thermal decomposition of the product. After the reaction has come to completion, as indicated by drop in the temperature, carbon disulfide is run into the mixture and the agitation continued. The carbon disulfide may also be added immediately after the addition of the mercaptan, or they may be added simultaneously.

After the reaction has come to completion, the product will be found suitable, for example, for use as a flotation reagent without further treatment of any kind, and will be found to contain about one mol of water per mol of the trithiocarbonate. This water is produced in the reaction itself during the formation of the mercaptan, according to the reaction:

$$MOH + RSH + CS_2 \longrightarrow MS-\overset{\overset{S}{\|}}{C}-SR + H_2O$$

(In which M=an alkali metal and R=an alkyl group.)

In carrying out this reaction the mixer will desirably be closed and provided with a reflux condenser to prevent loss of carbon disulfide and/or the alkyl mercaptan or influx of air during the reaction, and will desirably be flooded with an inert gas, such as, nitrogen, hydrogen or other non-oxidizing gases to prevent oxidation or explosion.

To further illustrate the method in accordance with this invention I may cite the following examples:

*Example I*

Twenty-five pounds of flaked sodium hydroxide were placed in a Werner-Pfleiderer type mixer, having a capacity of 28 gallons, and equipped with a water-jacket, an inlet pipe and outlet leading to the condenser, and a thermometer well. The mixer is flooded with nitrogen to remove the air present. A total of 45 pounds of a mercaptan mixture containing principally methyl, ethyl, propyl and butyl mercaptans with some sulfide, with the following boiling range, were then fed into the mixer:

| | |
|---|---|
| Initial boiling point | 30° C. |
| 10 | 33 |
| 20 | 35 |
| 30 | 37 |
| 40 | 39 |
| 50 | 42 |
| 60 | 45 |
| 70 | 48 |
| 80 | 54 |
| 90 | 64 |
| Final boiling point | 163° C. |

The rate at which the mercaptan was added was controlled so the temperature was not allowed to exceed about 45–50° C., and required about 2½ hours. After the addition of the mercaptan was complete the mixing was continued until the reaction was complete, as indicated by a drop in temperature. This occurred in about one hour after the addition of the mercaptan. Forty-seven and one-half pounds of carbon disulfide was then slowly added to the mixture, the rate of addition being adjusted so the temperature did not exceed 45–47° C. This addition required about three hours. The mixing was then continued for another three hours, at the end of which the reaction had gone to completion as indicated by a drop of the temperature to 30–33° C. The product was found to be solid and apparently dry, weighing 106½ pounds.

*Example II*

Twenty-five parts by weight of a mixture of mercaptans described in Example I and 30.5 parts by weight of carbon disulfide were mixed together in a reaction vessel provided with a reflux condenser and provided for stirring the reaction mixture. Sixteen parts by weight of powdered sodium hydroxide were added to the reaction mixture in small portions at short intervals. The mixture was agitated between each addition of caustic, and a slight refluxing of the mercaptan and carbon disulfide took place. At the end of the reaction, the product after being cooled to room temperature was a solid, apparently dry material. It was pulverized with a recovery of 68 parts by weight. The theoretical yield was 64.5 parts by weight, so the product contained 3.5 parts by weight of water.

*Example III*

Ten parts by weight of an aliphatic mercaptan cut boiling within the range of about 70° C. to about 94° C. and consisting principally of butyl mercaptan and 3.4 parts by weight of sodium monoxide were thoroughly admixed together until all particles of the sodium monoxide were broken up and had disappeared. Ten parts by weight of carbon disulfide were then added to the reaction mixture and the stirring continued. Reaction was indicated by a rise in temperature and by the reaction mass turning yellow. At the end of the reaction, as indicated by a drop in the temperature, a thick pasty mass remained, which set up to an apparently dry solid on standing. Fourteen parts by weight of the trithiocarbonate were recovered, which consisted principally of a mixture of sodium butyl trithiocarbonate.

*Example IV*

One gram of sodium monoxide was placed in a test tube and to it were added 3.7 grams of a mixture of amyl mercaptans. Three grams of carbon disulfide were then added. As the mixture was stirred the mixture turned yellow, showing that the trithiocarbonate was being formed. Stirring was continued until the mass became more viscous, and 3 to 4 drops of water were added to speed reaction to completion. After standing overnight, an apparently dry yellow solid was obtained. This solid was a mixture of sodium amyl trithiocarbonates which contained a small quantity of water.

It will be understood that the details and examples hereinbefore set forth are illustrative only, and that the invention as herein broadly described and claimed is in no way limited thereby.

What I claim and desire to protect by Letters Patent is:

1. A method for the production of an alkali metal salt of a mono-alkyl trithiocarbonate, which comprises reacting substantially molecular proportions of an alkyl mercaptan, a material from the group consisting of alkali metal hydroxsides and alkali metal monoxides and carbon disulfide in the presence of a liquid reaction medium consisting of not more than one mol of water in excess of that formed by the reaction.

2. A method for the production of an alkali metal salt of a mono-alkyl trithiocarbonate, which comprises reacting substantially molecular proportions of an alkyl mercaptan, an alkali metal hydroxide and carbon disulfide in the presence of a liquid reaction medium consisting of not more than one mol of water in excess of that formed by the reaction.

3. A method for the production of an alkali metal salt of a mono-alkyl trithiocarbonate, which comprises reacting substantially molecular proportions of an alkyl mercaptan, an alkali metal monoxide and carbon disulfide in the presence of a liquid reaction medium consisting of not more than one mol of water in excess of that formed by the reaction.

4. A method for the production of an alkali metal salt of a mono-alkyl trithiocarbonate, which comprises reacting substantially molecular proportions of an alkyl mercaptan, a material from the group consisting of alkali metal hydroxides and alkali metal monoxides and carbon disulfide the only liquid medium present being the water of reaction.

5. A method for the production of an alkali metal salt of a mono-alkyl trithiocarbonate, which comprises reacting substantially molecular proportions of an alkyl mercaptan, an alkali metal hydroxide and carbon disulfide, the only liquid medium present being the water of reaction.

6. A method for the production of an alkali metal salt of a mono-alkyl trithiocarbonate, which comprises reacting substantially molecular proportions of an alkyl mercaptan, an alkali metal monoxide and carbon disulfide the only liquid medium present being the water of reaction.

7. A method for the production of an alkali metal salt of a mono-alkyl trithiocarbonate, which comprises reacting substantially molecular proportions of an alkyl mercaptan, a material from the group consisting of alkali metal hydroxides and alkali metal monoxides and carbon disulfide in the presence of a liquid reaction medium consisting of not more than one mol of water in excess of that formed by the reaction, and under substantially non-oxidizing conditions.

WILLIAM T. BISHOP.